C. F. Mawbey.
Gate.
N° 72657 — Patented Dec. 24, 1867.
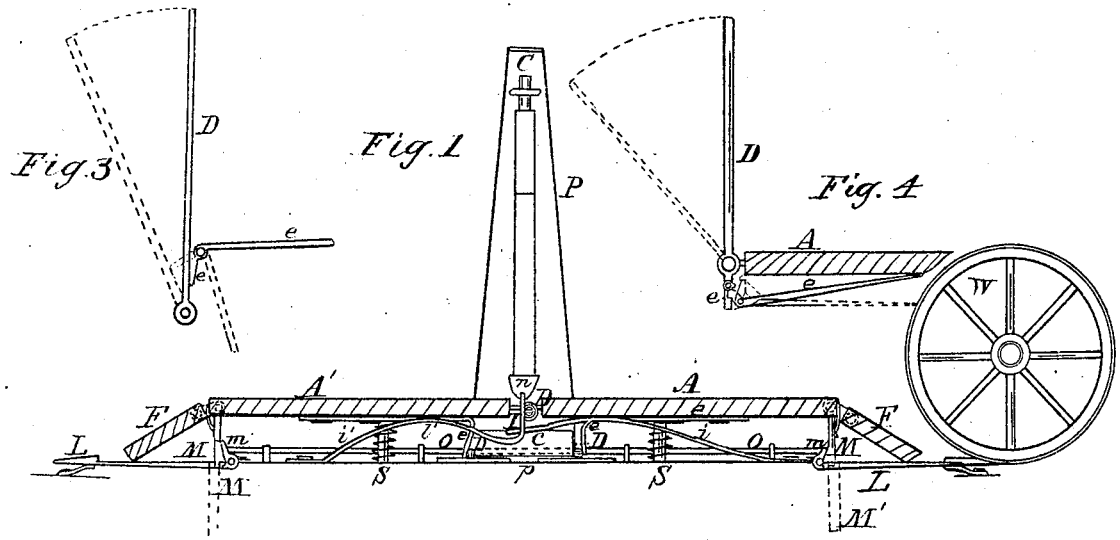
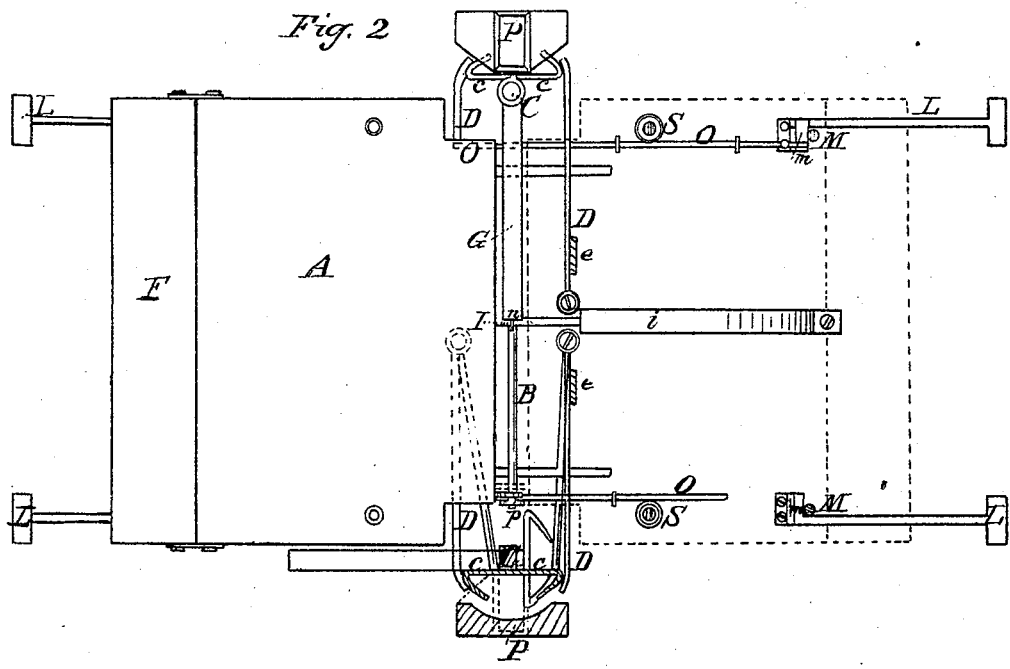
Witnesses
S. C. Kemon
C. A. Pettit
Inventor
Chas. F. Mawbey
By Munn & Co
Attorneys

United States Patent Office.

CHARLES F. MAWBEY, OF WOODBRIDGE, NEW JERSEY.

Letters Patent No. 72,657, dated December 24, 1867.

IMPROVEMENT IN GATES.

*The Schedule referred to in these Letters Patent and making part of the same.*

TO ALL WHOM IT MAY CONCERN:

Be it known that I, CHARLES F. MAWBEY, of Woodbridge, in the county of Middlesex, and State of New Jersey, have invented a new and improved Automatic Gate; and I do hereby declare the following to be a full, clear, and exact description of the same, sufficient to enable those skilled in the art to which my invention appertains to make use of it, reference being had to the accompanying drawings, forming part of this specification, in which—

Figure 1 is a longitudinal vertical section.

Figure 2 is a top view, the platform on one side being removed.

Figures 3 and 4 are detached views, showing how the platforms operate the rods that open and shut the gates.

In this invention a platform is arranged on each side of the gates, and connected with them by a peculiar and exceedingly simple and effective device. When a horse or other weight comes upon either platform, the gates fly open from him. As the horse passes through and steps upon the other platform, the latter operates to hold the gates open till the carriage has passed, when they swing together and latch by their own weight.

In the drawings, P P represent the gate-posts, and G G the gates, the latter being hung by staples in the vertical posts, and their bottom staples being a little out of line with their top ones, so that the weight of the gates will operate to close them. Two short posts, p p, are driven into the ground between the posts P P, directly under the gates when closed, and a stout iron bar, B, extends between them in a horizontal position, six or eight inches above the ground. To this bar are hinged two horizontal platforms A A', one on each side of the gate. Springs S S support the platforms in a horizontal position when no weight is upon them, but when the weight of a horse rests upon either platform, the spring under it yields and allows the outer end of the platform to be depressed to the ground. A plank, F, is attached to the outer edge of the platforms by hinges, which allow its outer edge to rest on the ground, for the purpose of affording an incline upon which the wheels of carriages may easily ascend to and descend from the platforms. The gates swing above the platforms, but the standards C C forming their outer edges, by which they are attached to the posts, extend nearly to the ground, and at their lower end are provided with horizontal arms c c, extending at right angles with the bar B. These arms will operate to the best advantage when made in the shape shown in fig. 2, being a simple plate of iron attached at the centre to the standard, and having its ends bent back in the shape of a clock-pallet. But I do not confine myself to any particular shape in constructing them. A horizontal rod, D, is provided under the platforms, on each side of each gate, pivoted upon a vertical pin at its inner end, and having its outer end in contact with the arm c. An arm, e, is fixed to the inner edge of the platform, underneath it, near the centre of each gate, and so adjusted to the rod D and arm c, that when the platform is depressed, the arm e shall swing the rod D against the arm c, and cause it to press against that arm until it swings the gate wide open. Or if the gate is open when the platform is depressed, the operation of these parts will be to press the rod D against the arm c with such force as to prevent the gate from moving and closing. The arm e may be in the form of a lever attached under the platform, as shown in figs. 3 and 4, if preferred. At the centre of the bar B a vertical sliding latch, I, is provided, sliding into notches or mortises n n, at the lower inner corners of the gates, and holding them firmly closed. The latch consists of a spring, i, bent in the form shown in fig. 1, and operating in connection with another, i', constructed and attached as shown in the same figure. The end of the latter spring passes through a slot in the former, so that one spring cannot be depressed without depressing the other. Each spring is bent up at its centre, so as to touch or nearly touch the under side of the platform under which it is situated. By this means, whenever either platform is depressed, it presses at once on the spring i or i' under it, and pressing the spring down causes the latch I to move down out of the mortise n, and out of the way of the horse or carriage, and to remain out of the way until the gates are closed. When the weight is removed from both platforms they rise, the springs i i' operate, and the latch I resumes its position, and holds the gates closed as before.

As thus constructed, whenever a horse, carriage, or other sufficient weight comes upon one of the platforms A, it depresses the platform, unlatches the gates at I, and by means of the rods D throws both gates open in the direction from the approaching weight. When the weight passes off of the platform A and comes upon the platform A', the latter is depressed and holds the gates open until the weight has left both platforms, when the gates close and latch by their own weight, as above described.

Unless there were some additional apparatus provided, this arrangement would be liable to the objection that any stray animals passing along the road, could open the gates and pass through by merely walking over the platforms. To remedy this, I provide short hinged spring-levers L L, at the carriage tracks on either side of the platforms, provided with an arm, m. The outer edges of the platforms are provided with supporting-rods or props M M, which, when the platforms are up, rest upon the ground, or a block or plate at the surface of the ground, under the platform, and prevent the platform from being depressed. But when a carriage-wheel is driven upon the lever L, it causes the arm m of the lever to strike against the prop M and move the bottom of it out of its position till it drops into a hole or recess, M', and ceases to support the platform. In this way a stray cow or other animal coming upon the platform is unable to open the gates, but a carriage operates them at once. From the arm m a rod, O, extends to and is connected with the bar D of the opposite platform, as shown in the drawings, by which means the depressing of one platform will operate the rod O, arm e, and prop M of the other platform, and release it, so that the carriage entering upon it from its inner edge will operate it as well as when passing upon it over the lever L.

Having thus described my invention, what I claim as new, and desire to secure by Letters Patent, is—

1. The combination of the gates G, arms c, and pivoted rods D, when constructed as shown, and arranged so as to be operated by the platforms A A', substantially in the manner and for the purpose set forth.

2. I claim the platforms A A', when pivoted at their inner edges under the gates G G, and operating the gates, substantially in the manner and for the purposes specified.

3. I claim the hinged plank F, when attached to the outer edge of the platforms, and operating substantially in the manner and for the purposes specified.

4. I claim the combination of the latch I, springs $i$ $i'$, platforms A A', and gates G G, substantially as and for the purpose set forth.

5. I claim the movable prop M, or its equivalent, in combination with the platform A A, when so constructed and arranged that when thrown out of position it will allow the platform A A to descend.

6. I claim the combination of the lever L, prop M, rod O, and bar D, when operating in the manner and for the purposes specified.

CHAS. F. MAWBEY.

Witnesses:
   CHAS. A. PETTIT,
   SOLON C. KEMON.